Figure 1:
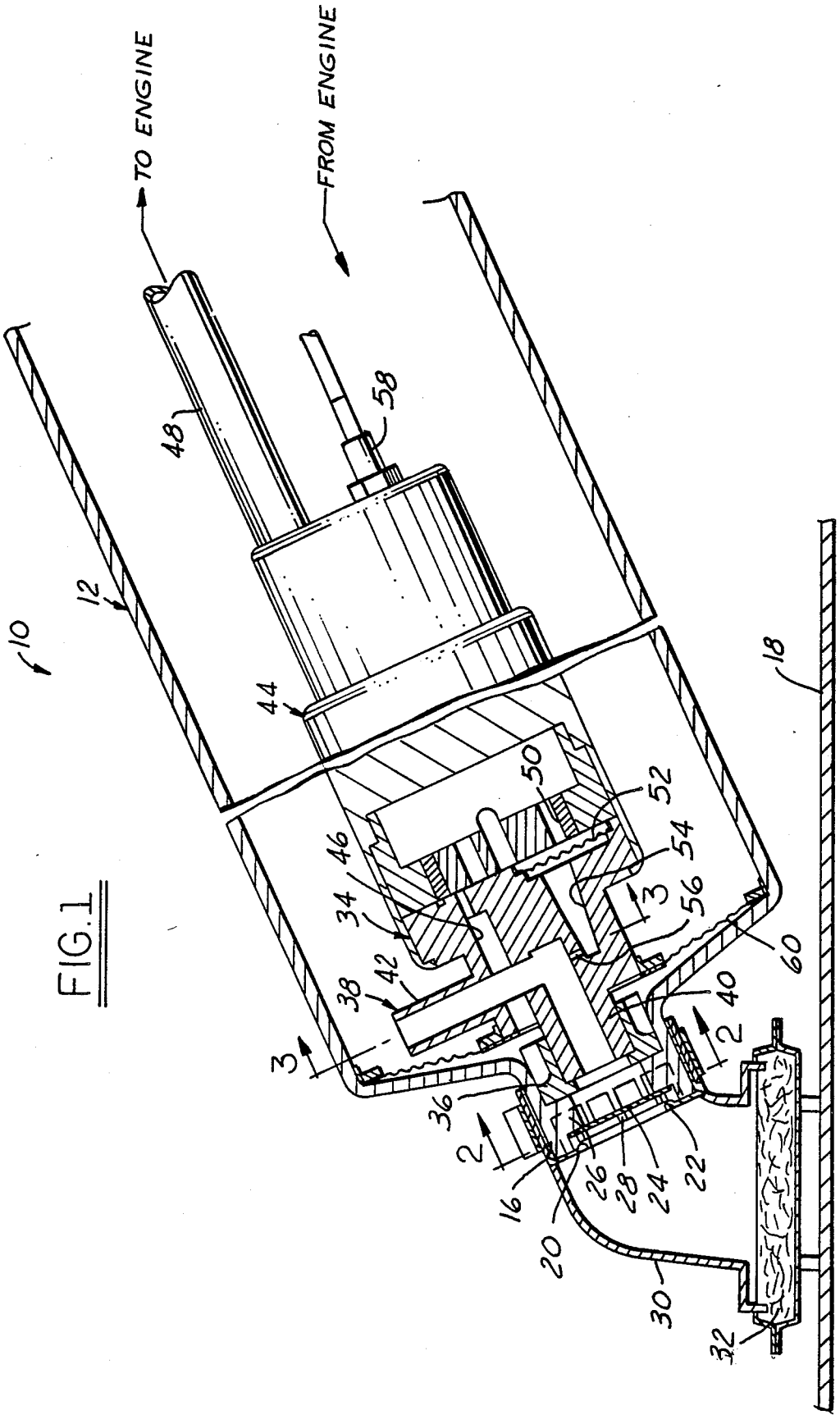

United States Patent [19]

Tuckey

[11] Patent Number: 4,878,518
[45] Date of Patent: * Nov. 7, 1989

[54] IN-TANK FUEL RESERVOIR WITH FUEL VAPOR SEPARATION

[75] Inventor: Charles H. Tuckey, Cass City, Mich.

[73] Assignee: Walbro Corporation, Cass City, Mich.

[*] Notice: The portion of the term of this patent subsequent to Nov. 7, 2006 has been disclaimed.

[21] Appl. No.: 201,418

[22] Filed: Jun. 2, 1988

Related U.S. Application Data

[63] Continuation-in-part of Ser. No. 153,316, Feb. 8, 1988, Pat. No. 4,831,990, which is a continuation-in-part of Ser. No. 49,537, May 14, 1987, Pat. No. 4,807,582, which is a continuation-in-part of Ser. No. 928,184, Nov. 7, 1986, Pat. No. 4,747,388.

[51] Int. Cl.$^4$ .................... B60K 15/02; F04F 5/02
[52] U.S. Cl. .................... 137/448; 123/510; 137/566; 137/576; 417/76; 417/89
[58] Field of Search ............... 137/448, 574, 575, 576, 137/566; 417/76, 85, 87, 89, 191, 410, 249; 123/510, 514, 516

[56] References Cited

U.S. PATENT DOCUMENTS

| | | | |
|---|---|---|---|
| 2,263,296 | 11/1941 | Grise | 417/249 X |
| 2,707,021 | 4/1955 | Harris | 417/76 X |
| 2,763,281 | 9/1956 | Morgan | 417/249 X |
| 2,953,156 | 9/1960 | Bryant | 417/249 X |
| 4,279,232 | 7/1981 | Schuster et al. | 123/516 |
| 4,397,333 | 8/1983 | Liba et al. | 123/514 X |
| 4,546,750 | 10/1985 | Brunell et al. | 137/576 X |
| 4,596,519 | 6/1986 | Tuckey | 418/15 |

FOREIGN PATENT DOCUMENTS 2172864 10/1986 United Kingdom .

Primary Examiner—Stephen Hepperle
Attorney, Agent, or Firm—Barnes, Kisselle, Raisch, Choate, Whittemore & Hulbert

[57] ABSTRACT

A fuel delivery systems for automotive engine and like applications, which comprises a canister for positioning within a fuel tank having a lower end with a fuel opening and an internal wall spaced from such lower end dividing the canister into upper and lower fuel chambers. An electric-motor fuel pump is positioned within the upper chamber and has a fuel inlet, a primary fuel outlet for feeding high-volume fuel under pressure to an engine, and a secondary outlet for likewise supplying fuel under pressure at smaller volume than the primary outlet. A fluid conduit extends through the canister internal wall, and has an inlet end in the lower chamber and an outlet end positioned in the upper chamber. A nozzle couples the secondary pump outlet to the conduit for aspirating fuel through the conduit from the lower chamber to the upper chamber. Thus, any vapor collected in the lower chamber is entrained in aspirated fuel and fed to the upper chamber where it is free to vent to the fuel tank through the open upper end of the canister.

10 Claims, 3 Drawing Sheets

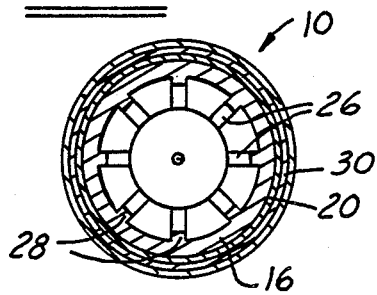
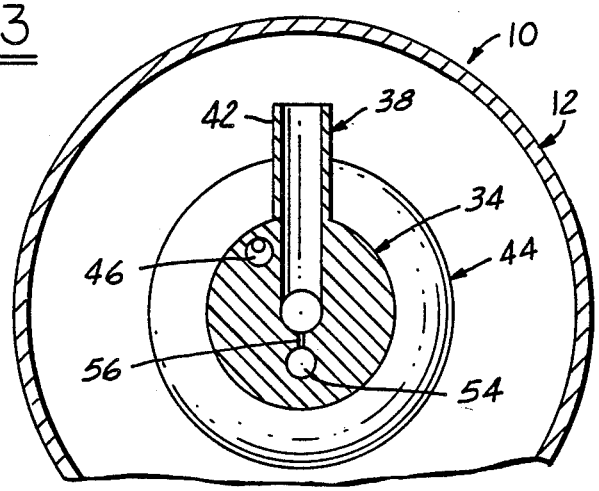
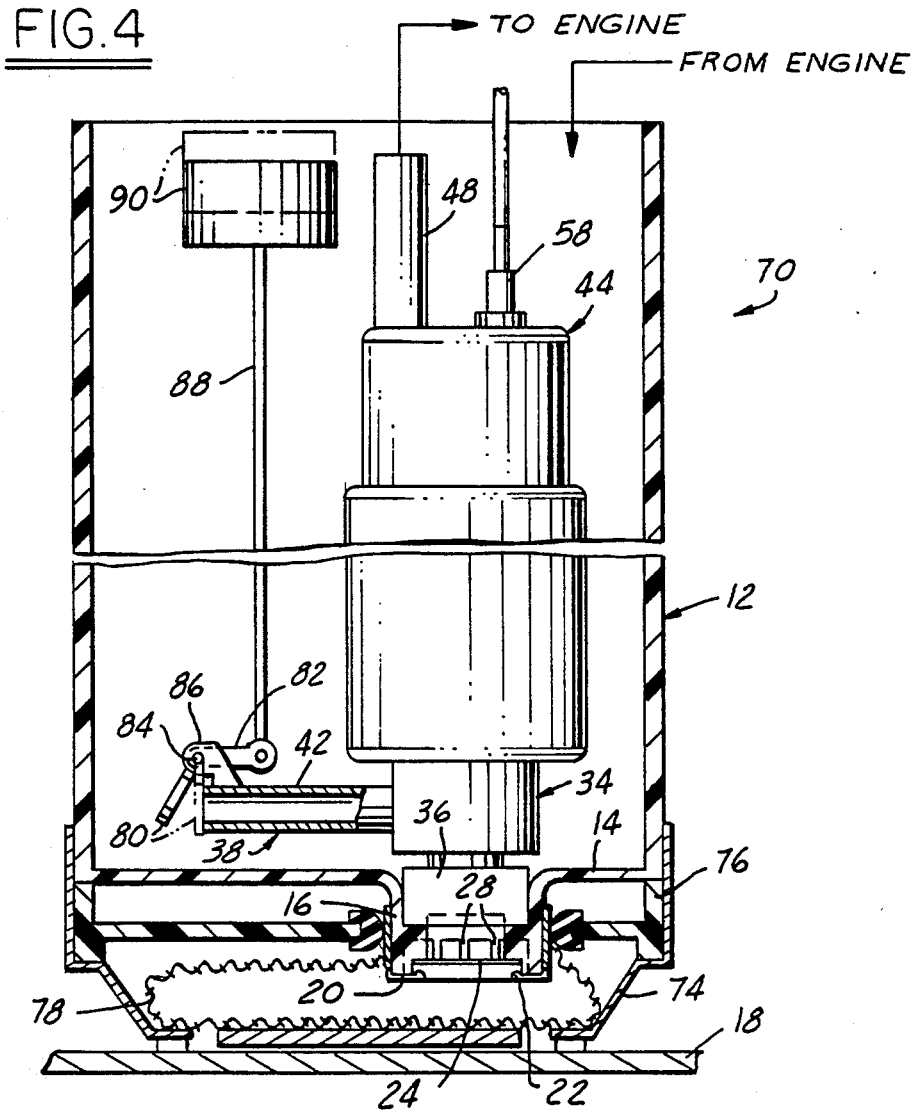

IN-TANK FUEL RESERVOIR WITH FUEL VAPOR SEPARATION

This application is a continuation-in-part of application Ser. No. 153,316, filed Feb. 8, 1988, now U.S. Pat. No. 4,831,990, which is a continuation-in-part of application Ser. No. 49,537, filed May 14, 1987, now U.S. Pat. No. 4,807,582, which is a continuation-in-part of application Ser. No. 928,184, filed Nov. 7, 1986, now U.S. Pat. No. 4,747,388.

The present invention is directed to fuel delivery systems for automotive engine and like applications, and more particularly to a fuel pump module which includes an electric fuel pump mounted within an in-tank reservoir.

U.S. Pat. application Ser. No. 928,184, filed Nov. 7, 1986, discloses a fuel delivery system for automotive vehicles which includes a fuel canister positioned within a fuel tank and containing an electric-motor fuel pump. The canister has an open lower end positioned at the bottom of the fuel tank, and an internal wall spaced from the open end to define separate upper and lower fuel canister chambers. The fuel pump is positioned within the upper chamber, has an inlet coupled to the lower chamber for drawing fuel therefrom, and an outlet for feeding fuel under pressure to an engine or the like. A pressure regulator valve bypasses excess fuel which is returned to the upper canister chamber, which thus forms a fuel reservoir surrounding the fuel pump. A filter diaphragm spans the open lower end of the canister and is characterized by permitting free flow of liquid fuel therethrough, while being closed by surface tension of liquid fuel to restrict passage of air therethrough. The diaphragm is coupled by a lever to a valve in the canister wall so that, in the absence of fuel at the open canister end, the diaphragm is drawn into the lower chamber by fuel pump suction and opens the valve, so that fuel is made available to the pump inlet from the upper chamber reservoir.

Although the fuel delivery system so disclosed in the noted patent application has enjoyed substantial acceptance and success, improvements remain desirable. In particular, heat of excess fuel returned from the engine, particularly in combination with highly volatile so-called winterized fuel blends, can lead to accumulation of vapor within the lower chamber and vapor lock at the fuel pump inlet. It is therefore an object of the present invention to provide a mechanism for venting any vapors trapped within the lower canister chamber, and thereby prevent delivery thereof to the fuel pump inlet and consequent potential vapor lock of the fuel delivery system.

In accordance with the present invention, a fuel delivery system for automotive engine and like applications comprises a canister for positioning within a fuel tank having a lower end with a fuel opening and an internal wall spaced from such lower end dividing the canister into upper and lower fuel chambers. An electric-motor fuel pump is positioned within the upper chamber and has a bottom fuel inlet, a primary fuel outlet at the top of the pump for feeding high volume fuel under pressure to an engine, and a secondary fuel outlet at the base of the pump for likewise supplying fuel under pressure at smaller volume than the high volume outlet. A fluid conduit extends through the canister internal wall, and has an inlet end in the lower chamber and an outlet end positioned in the upper chamber. A nozzle couples the secondary pump outlet to the conduit for aspirating fuel through the conduit from the lower chamber to the upper chamber. Thus, any vapor collected in the lower chamber is entrained in aspirated fuel and fed to the upper chamber where it is free to vent to the fuel tank through the open upper end of the canister.

Figure 5:
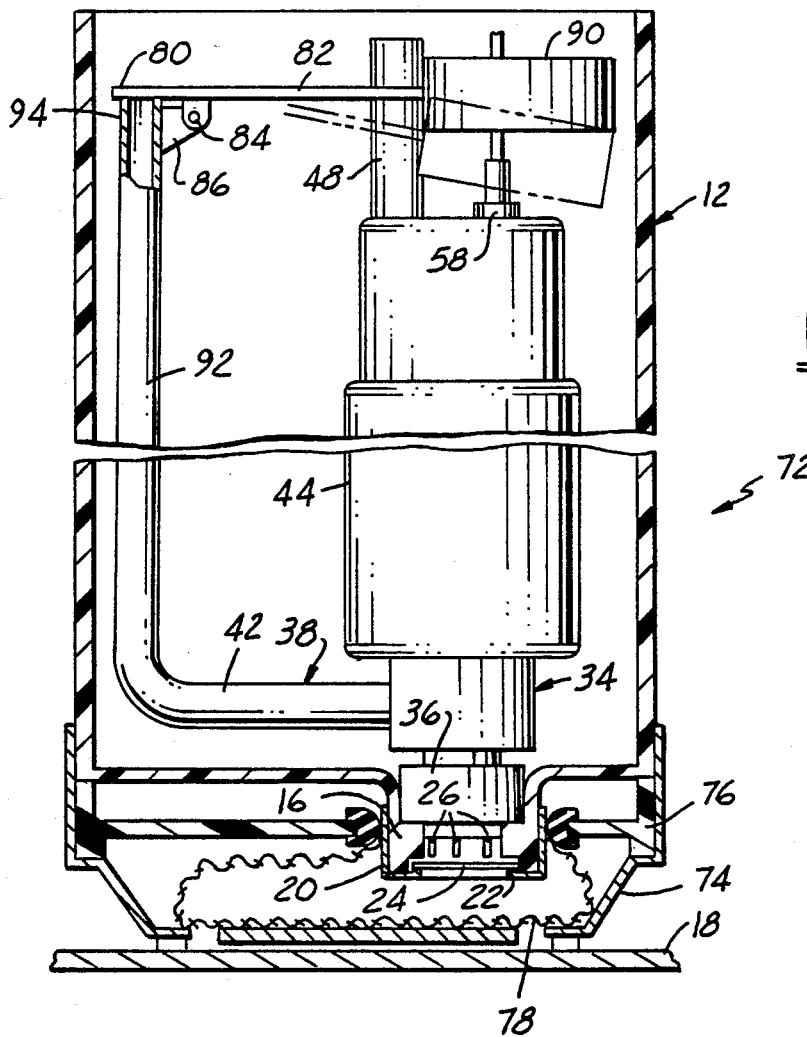

In the preferred embodiments of the invention, the fluid aspiration conduit includes first and second portions which form a right-angle bend, with the first portion being upwardly oriented and forming an inlet from the lower chamber, and the second portion being laterally or radially oriented and forming an outlet to the upper chamber. The aspiration nozzle preferably takes the form of a lateral orifice in the sidewall of the first conduit portion positioned at the right-angle bend in axial alignment with the second portion of the fluid conduit. The fuel pump inlet in the preferred embodiments of the invention is positioned at the lower portion of the upper chamber, and thus draws fuel to the fuel pump solely from the upper chamber. A valve may be coupled to a float positioned within the upper chamber to close the outlet end of the fluid aspiration conduit when fuel in the upper chamber reaches a preselected level, corresponding to maximum desired fuel level within the upper canister chamber. The invention, together with additional objects, features and advantages thereof, will be best understood from the following description, the appended claims and the accompanying drawings in which:

FIG. 1 is a fragmentary sectional view in side elevation of a fuel delivery module in accordance with one presently preferred embodiment of the invention;

FIGS. 2 and 3 are sectional views taken substantially along the respective lines 2—2 and 3—3 in FIG. 1; and FIGS. 4 and 5 are sectional views in side elevation of respective modified embodiments of the invention.

FIGS. 1–3 illustrate a fuel delivery system 10 in accordance with one presently preferred embodiment of the invention as comprising a generally cylindrical canister 12 having a lower end 14 which tapers to a neck 16. The upper end of canister 12 either is open or is closed with suitable means (not shown) for permitting fuel vapors within canister 12 to vent into the upper portion of fuel tank 18. An end cap 20 is crimped or otherwise fastened over the open lower end of neck 16 and has a central opening surrounded by an annular enlargement or bead 22 coaxial with neck 16. A foot valve 24, in the form of a flat imperforate disc, is movably captured between bead 22 and the shoulders 26 (FIGS. 1 and 2) formed by an annular array of angularly spaced radially and axially extending ribs 28 on the inside surface of neck 16 adjacent to cap 20. The inside diameter of ribs 26 between shoulders 24 and bead 22 is slightly greater than the outer diameter of disc 24 to prevent radial movement and to guide axial movement thereof. A tubular extension 30 is externally affixed to neck 16 and extends therefrom to a lower portion of tank 18 adjacent to the lower wall thereof. A filter 32 is carried within extension 30 for filtering sediment and the like from fuel admitted to extension 30 from tank 18.

An aspiration pump module 34 is mounted within canister 12 by an annular seal 36 positioned within neck 16 against the coplanar axially inner ends of ribs 28. Seal 36 thus effectively forms an internal canister wall for separating a lower canister chamber within extension 30 and neck 16 from an upper canister chamber in which module 34 is positioned. Pump module 34 includes a fluid conduit 38 in which a first or inlet portion 40 extends from seal 36 coaxially with neck 16. A second or outlet portion 42 is at right angles to portion 40 and extends laterally or radially of the neck and canister axis. An electric-motor positive displacement fuel pump 44 has an inlet 46 which extends as a passage through module 34 and terminates above seal 36 for drawing fuel to pump 44 from the lower portion of the upper chamber of canister 12. A primary fuel outlet 48 of pump 44 feeds fuel under pressure to an engine or other fuel consumer (not shown). A secondary fuel outlet 50 feeds a lesser quantity of fuel under pressure to pump module 34 through a filter screen 52 to a narrowingly tapered aperture 54 (FIGS. 1 and 3) which has an axis laterally offset from the central axis of module 34 and canister 12. A nozzle orifice 56 extends laterally from the narrow end of aperture 54 through the wall of fluid conduit 40 coaxially with conduit outlet portion 42 and diametrically opposed therefrom across the central axis of module 34 and neck 16 to form an aspiration pump.

With the exception of fuel outlet 50, pump 44 is as disclosed in U.S. Pat. No. 4,596,519 assigned to the assignee hereof and incorporated herein by reference. Outlet 50 is formed in the pump of the referenced disclosure as a passage which extends to the case or volume which surrounds the pump rotor and is at pump outlet pressure. Terminals 58 on pump 44 provide connection to a source of electrical power (not shown). A filter screen 60 spans the lower end of the canister upper chamber between module 34 and the canister inside wall surface to provide secondary filtering of fuel prior to passage to inlet port 46. This filter serves also to separate any vapor entrained in the fuel being aspirated to inlet, 46.

In operation, fuel within the upper chamber of canister 12 is drawn through filter 60 and inlet passage 46 to pump 44, from whence the major portion is fed by outlet 48 to the engine or other consumer. Excess fuel from the engine is returned to canister 12. In the meantime, a lesser volume of fuel under high pressure at outlet 50 of pump 44 is fed through screen 52 and aperture 54 to orifice 56 and from whence it is injected under pressure into conduit 38 coaxially with conduit outlet portion 42. Such jet spray of fuel through orifice 56 creates a negative pressure on valve disc 24 and draws the same upwardly against shoulders 26 to the position shown in FIG. 1. Fuel within tank 18 is drawn through filter 32 and extension 30, around valve disc 24 through the spaces between ribs 28, and into and through conduit 40 and is discharged through conduit 38 into the upper portion of canister 12. Any vapors entrained in fuel aspirated through conduit 38 into the upper portion of canister 12 are free to rise to the upper portion of the canister and return to the upper portion of the fuel tank. In the meantime, liquid fuel is available at the lower portion of canister 12 for input to pump 44 through passage 46. When pump 44 is de-energized by removal of electrical power therefrom, pressure differential across valve disc 24 is thus removed and valve 24 seats against annular bead 22 for preventing reverse flow of fuel from canister 12 to tank 18. The combination of pump 44 and module 34 thus effectively forms a two-stage pump assembly. In the first stage, fuel is aspirated from the lower canister chamber within neck 30 through conduit 38 to the upper canister chamber. In the second stage, fuel is pumped from the upper canister to the engine.

FIGS. 4 and 5 illustrate fuel modules 70, 72 in accordance with the respective modified embodiments of the invention. In each of FIGS. 4 and 5, reference numerals identical to those employed in conjunction with the preferred embodiment of FIGS. 1-3 indicate corresponding functionally identical components. In module 70 (FIG. 4), a canister support 74 is affixed to the lower end of canister 12, with a spacer 76 externally engaging and fixturing canister neck 16. A bag-type or sock-type filter 78 surrounds the inlet to neck 16 for filtering fuel drawn from tank 18. A valve disc 80 is carried by a lever 82 which is pivotally mounted by pin 84 to a rib 86 upstanding from the outlet end of conduit portion 42. The opposing end of lever 82 is pivotally coupled to a rod 88 which extends upwardly within canister 12 to a float 90 of suitable buoyant material construction. Float 90 is positioned adjacent to the upper end of canister 12 at a level corresponding to maximum desired fuel level within canister 12. When fuel is below such maximum desired level, the weight of float 90 and rod 88 urges lever 82 clockwise to the position illustrated in solid lines in FIG. 4 at which valve disc 80 is pivoted away from the opposing flat end of conduit portion 42. Fuel is thereby permitted to aspirate through pump module 34 into the upper canister chamber as previously described when pump 44 is activated. However, when fuel reaches the maximum desired level at which float 90 is positioned, buoyancy of float 90 draws rod 88 and lever 82 upwardly or counterclockwise (phantom lines in FIG. 4), pivoting valve disc 80 into seating engagement with the opposing end of conduit portion 42. Further aspiration of fuel into canister 12 is thereby prevented. This limits the fuel level in canister 12, prevents overflow into the main fuel tank, and results in the flow of return fuel into the canister to supply the pump inlet. This prevents the hot return fuel from overflowing into the main fuel tank.

The same effect is obtained in module 72 of FIG. 5, where outlet portion 42 of fluid conduit 38 is extended as a vertical standpipe 92 to an upper end 94 at a position corresponding to maximum desired fuel level within canister 12. Float 90 is directly coupled to an extension on lever 82 for closing the upper end 94 of standpipe 92 (solid lines in FIG. 5) when fuel within canister 12 reaches maximum desired level. In each of the embodiments of FIGS. 4 and 5 fuel is continuously drawn directly from the upper chamber of canister 12, as in the embodiments of FIGS. 1-3, so that valves 80 are normally open and any vapors entrained in liquid fuel entering the fuel module are automatically removed in accordance with the principles of the invention hereinabove discussed.

The invention claimed is:

1. A fuel delivery system for automotive engines and the like comprising:

a canister for positioning within a fuel tank and having a lower end with an opening and means forming an internal wall spaced from said lower end and dividing said canister into upper and lower canister chambers, an electric-motor fuel pump having a fuel inlet, a primary fuel outlet for feeding fuel under pressure to an engine and a secondary fuel outlet for supplying fuel under pressure, said fuel pump including both said outlets being positioned within said upper chamber, and fuel aspiration module means within said canister extending between and coupling said fuel pump and said lower chamber, said fuel pump aspiration module means including fluid conduit means extending through said wall having an inlet end in said lower chamber and an outlet end positioned in said upper chamber, and nozzle means within said module means directly coupling said secondary outlet to said fluid conduit means within said canister for aspirating fuel through said fluid conduit means from said lower chamber to said upper chamber.

2. A fuel delivery system for automotive engines and the like comprising:

a canister for positioning within a fuel tank and having a lower end with an opening and means forming an internal wall spaced from said lower end and dividing said canister into upper and lower canister chambers, an electric-motor fuel pump having a fuel inlet, a primary fuel outlet for feeding fuel under pressure to an engine and a secondary fuel outlet for supplying fuel under pressure, said fuel pump being positioned within said upper chamber, fluid conduit means extending through said wall having an inlet end in said lower chamber and an outlet end positioned in said upper chamber, said fluid conduit means including means forming a right-angle bend, and nozzle means coupling said secondary outlet to said fluid conduit means for aspirating fuel through said fluid conduit means from said lower chamber to said upper chamber, said nozzle comprising an orifice extending through a wall of said conduit means to said secondary pump outlet and being aligned with a portion of said bend extending toward said outlet end of said conduit means.

3. A fuel delivery system for automotive engines and the like comprising:

a canister for positioning within a fuel tank and having a lower end with an opening and means forming an internal wall spaced from said lower end and dividing said canister into upper and lower canister chambers, an electric-motor fuel pump having a fuel inlet, a primary fuel outlet for feeding fuel under pressure to an engine and a secondary fuel outlet for supplying fuel under pressure, said fuel pump being positioned within said upper chamber, fluid conduit means extending through said wall having an inlet end in said lower chamber and an outlet end positioned in said upper chamber, nozzle means coupling said secondary outlet to said fluid conduit means for aspirating fuel through said fluid conduit means from said lower chamber to said upper chamber, and valve means at said inlet end of said conduit means and responsive to aspiration pressure within said conduit means from said nozzle means for admitting fuel through said conduit means to said upper chamber.

4. The system as set forth in claim 1 wherein said fluid conduit means includes means forming a right-angle bend, said nozzle means being aligned with a portion of said bend extending toward said outlet end of said conduit means.

5. The system as set forth in claim 4 wherein said nozzle means comprises an orifice extending through a wall of said conduit means to said secondary pump outlet.

6. The system as set forth in claim 1 wherein said fuel pump inlet is positioned within said upper chamber.

7. The system as set forth in claim 1 comprising valve means positioned at said outlet end of said conduit means, and means responsive to fuel level in said upper chamber for selectively closing said valve means.

8. The system as set forth in claim 1 further comprising valve means at said inlet end of said conduit means and responsive to aspiration pressure within said conduit means from said nozzle means for admitting fuel through said conduit means to said upper chamber.

9. The system as set forth in claim 3 wherein said conduit means includes a valve seat surrounding said inlet end, a shoulder opposed to said seat, said valve means comprising an imperforate disc captured between said seat and said shoulder for seating engagement thereagainst, and means providing fluid bypass around said disc seated against said shoulder.

10. The system as set forth in claim 9 wherein said bypass-providing means comprise internal ribs on said conduit means for guiding motion of said disc between said seat and said shoulder.

* * * * *